United States Patent
Akimoto (10) Patent No.: US 9,298,743 B2
(45) Date of Patent: Mar. 29, 2016

(54) METHOD AND APPARATUS FOR DIVIDING A MOVING IMAGE INTO A PLURALITY OF MOVING IMAGES AND FURTHER UPLOADING THE PLURALITY OF MOVING IMAGES

(75) Inventor: Yasuhiro Akimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 933 days.

(21) Appl. No.: 12/578,373

(22) Filed: Oct. 13, 2009

(65) Prior Publication Data

US 2010/0091879 A1    Apr. 15, 2010

(30) Foreign Application Priority Data

Oct. 15, 2008  (JP) ................................. 2008-266811
Sep. 4, 2009   (JP) ................................. 2009-205124

(51) Int. Cl.
*H04N 7/12*     (2006.01)
*G06F 17/30*    (2006.01)
*G11B 27/032*   (2006.01)
*G11B 27/034*   (2006.01)
*G11B 27/10*    (2006.01)

(52) U.S. Cl.
CPC ........ *G06F 17/30265* (2013.01); *G11B 27/032* (2013.01); *G11B 27/034* (2013.01); *G11B 27/10* (2013.01)

(58) Field of Classification Search
CPC ............ G06F 17/30265; G11B 27/032; G11B 27/034; G11B 27/10
USPC ........................ 375/130–153, 240.01–240.29
IPC .................. H04B 1/66, 1/00; H04N 7/12, 7/26, H04N 11/02, 11/04
See application file for complete search history.

(56) References Cited

U.S. PATENT DOCUMENTS

| | | | | |
|---|---|---|---|---|
| 7,050,603 | B2* | 5/2006 | Rhoads ............. | G06F 17/30876 375/E7.076 |
| 7,403,655 | B2* | 7/2008 | Yamashita ............. | G11B 27/34 382/173 |
| 2003/0093564 | A1* | 5/2003 | Portuesi ............ | G06F 17/30017 709/245 |
| 2007/0288638 | A1* | 12/2007 | Vuong .................. | H04L 67/104 709/226 |
| 2009/0016691 | A1* | 1/2009 | Gould ...................... | H04N 5/76 386/200 |

FOREIGN PATENT DOCUMENTS

| JP | 2002-344914 A | 11/2002 |
|---|---|---|
| JP | 2004-328034 A | 11/2004 |
| JP | 2005-011119 A | 1/2005 |
| JP | 2005-086826 A | 3/2005 |
| JP | 2008136044 | * 11/2006 |
| JP | 2007-060286 A | 3/2007 |

(Continued)

*Primary Examiner* — Jessica M Prince (74) *Attorney, Agent, or Firm* — Canon USA Inc. IP Division (57) ABSTRACT

An apparatus includes a division unit which divides an original moving image into a plurality of uploading moving images, an uploading unit which uploads the plurality of uploading moving image onto an external apparatus in descending order of reproduction time sequence, an acquisition unit which acquires, from the external apparatus, sequel notice information including information about where an uploading moving image exists, and an addition unit which adds the acquired sequel notice information to an uploading moving image. Furthermore, the uploading unit uploads the uploading moving image, to which the sequel notice information is added, onto the external apparatus.

13 Claims, 10 Drawing Sheets

(56) References Cited

FOREIGN PATENT DOCUMENTS

| JP | 2008-136044 A | 6/2008 |
| JP | 2008-228120 A | 9/2008 |
| KR | 10-2006-0057563 A | 5/2006 |

* cited by examiner

METHOD AND APPARATUS FOR DIVIDING A MOVING IMAGE INTO A PLURALITY OF MOVING IMAGES AND FURTHER UPLOADING THE PLURALITY OF MOVING IMAGES

BACKGROUND OF THE INVENTION

1. Field of the Invention

The present invention relates to a method for allowing a plurality of information processing apparatuses to share moving image files on a network.

2. Description of the Related Art

A conventional moving image sharing service allows a moving image file uploaded by a user to be shared with his friends via the Internet or other networks. The uploaded moving image files are generally taken by the uploading user by using an imaging apparatus and is recorded on the imaging apparatus or on a recording medium.

In the above-described moving image sharing service, a moving image file is shared among a moving image uploading user and uploaded image viewing users in the following manner. A moving image uploading user uploads a moving image file from the user's apparatus onto a web server. Then, a viewing user downloads the moving image file onto the viewing user's apparatus from the web server.

Meanwhile, considering the protection of copyright or the saving of the server resource, an administrator of the web server may provide a restriction of the maximum file size or reproduction time length on an uploaded moving image file. Therefore, if a user who likes to upload a high-quality moving image file that records a moving image of a long recording time sequence, then it is for the user to generate a moving image file suitable for uploading (hereinafter simply referred to as an "uploading moving image file"), which satisfies the restriction condition of the moving image sharing service based on the original moving image file.

Accordingly, if a user likes to upload a moving image file of a size exceeding a maximum size condition applied on an uploading destination web server, the moving image uploading user is to generate an uploading moving image file by editing the moving image file by operating an information processing apparatus having a moving image editing function.

When a user has uploaded a series of moving image files, which have been generated by dividing an original moving image file into a plurality of moving image files, a viewing user cannot easily know whether a subsequent moving image file, whose content is continued from the one that the viewing user has already downloaded, exists.

In addition, even if a subsequent moving image file continued from the already-downloaded moving image file exists, then a viewing user cannot easily know which moving image file is continued from the downloaded file.

SUMMARY OF THE INVENTION

According to an aspect of the present invention, an apparatus includes a division unit configured to divide an original moving image into a plurality of uploading moving images, an uploading unit configured to upload the plurality of uploading moving images on an external apparatus in descending order of reproduction time sequence, an acquisition unit configured to acquire, from the external apparatus, sequel notice information including information about where the uploaded uploading moving image exists, and an addition unit configured to add the acquired sequel notice information to the uploading moving image, wherein the uploading unit is configured to upload the uploading moving image, to which the sequel notice information is added, onto the external apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to describe the principles of the invention.

DESCRIPTION OF THE EMBODIMENTS

Various exemplary embodiments, features, and aspects of the invention will be described in detail below with reference to the drawings.

Figure 1:
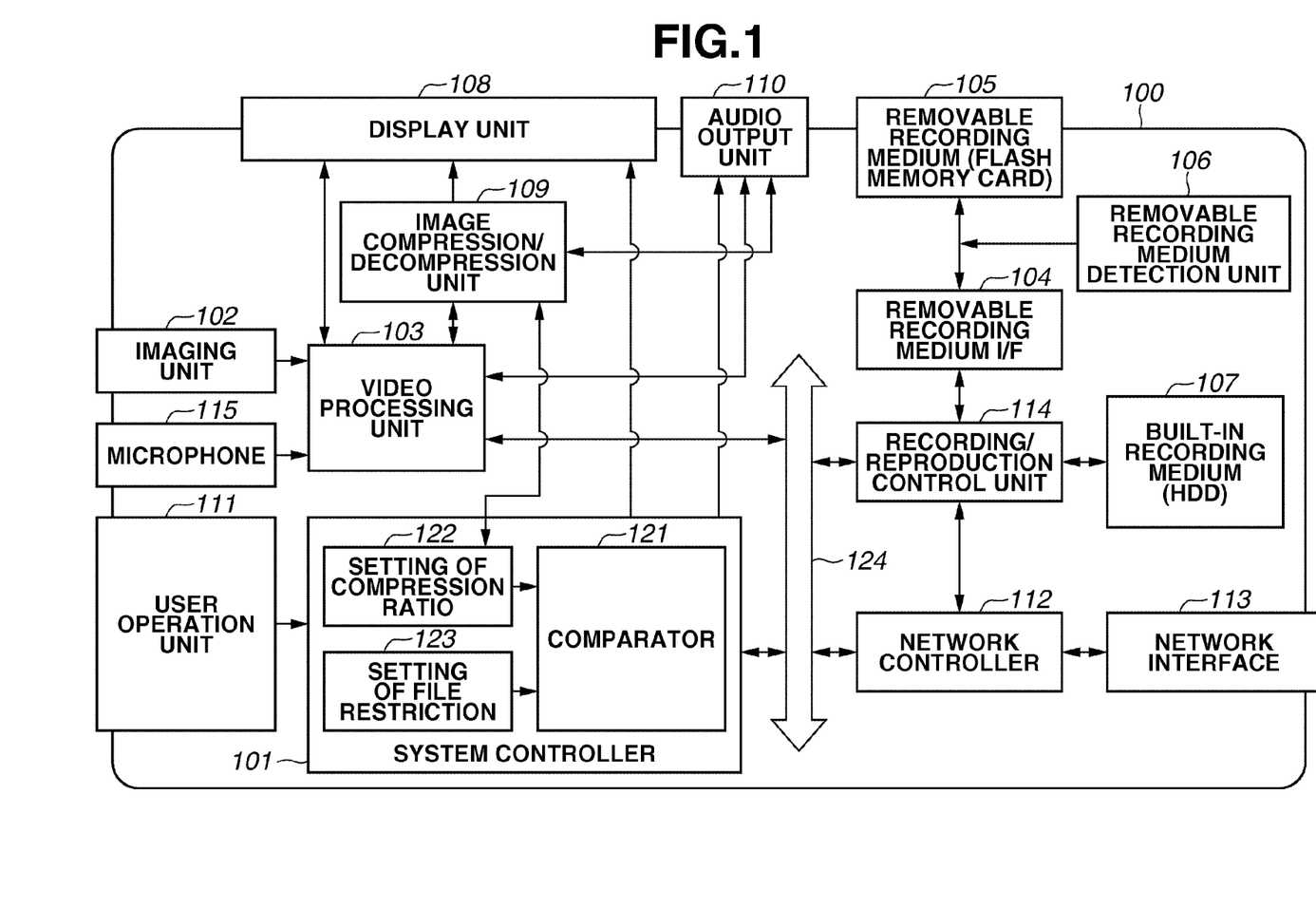
FIG. 1 is a block diagram illustrating an exemplary configuration of an imaging apparatus according to an exemplary embodiment of the present invention.

FIG. 1 is a block diagram illustrating an exemplary configuration of an imaging apparatus configured to shoot a moving image and record the moving image file according to a first exemplary embodiment of the present invention. Referring to FIG. 1, an imaging apparatus 100 is implemented as a digital video camera, for example. The imaging apparatus 100 includes a video block, a recording block, a reproduction/display block, a system block, and a communication block. Each block will be described in detail below.

A video block includes an imaging unit 102, a video processing unit 103, an image compression/decompression unit 109, and a microphone 115.

The imaging unit 102 converts an optical image into an electric signal and generates an analog video signal of a predetermined format. Then, the imaging unit 102 executes analog-to-digital (A/D) conversion on an analog video signal to convert the analog video signal into a digital video signal. In addition, the imaging unit 102 executes predetermined correction processing, such as gamma correction and color balance correction on the A/D-converted digital video signal. Furthermore, the imaging unit 102 transmits the digital video signal that has been subjected to the correction processing to the video processing unit 103.

An audio signal output from the microphone 115 is converted into a digital audio signal by A/D conversion. Then, the digital audio signal is subjected to various correction processing, such as noise removal processing and dynamic range restriction processing. The corrected digital audio signal is then transmitted to the video processing unit 103.

The video processing unit 103 combines the digital video signal and the digital audio signal respectively transmitted from the imaging unit 102 and the microphone 115. In addition, the video processing unit 103 executes compression and decompression processing on the combined digital video/audio signal. Furthermore, the video processing unit 103 converts the digital video signal, which includes the digital audio signal, into a predetermined moving image file format, such as Moving Picture Experts Group (MPEG) 4.

In addition, the video processing unit 103 transfers the converted moving image file to a recording/reproduction control unit 114 via a system bus 124. Furthermore, the video processing unit 103 transfers the digital video signal and the digital audio signal, which have been received respectively from the imaging unit 102 and the microphone 115, to the image compression/decompression unit 109.

The image compression/decompression unit 109 refers to a setting of the compression ratio 122, which is stored on a system controller 101. In addition, the image compression/decompression unit 109 recompresses the digital video signal and the digital audio signal, which have been received from the video processing unit 103. More specifically, the image compression/decompression unit 109 executes screen size conversion and bit rate conversion on the digital video signal and audio bit rate conversion on the digital audio signal.

The recording block includes the recording/reproduction control unit 114, a removable recording medium 105, a removable recording medium interface (I/F) 104, a removable recording medium detection unit 106, and a built-in recording medium 107 (i.e., HDD), which function to record various data.

The removable recording medium 105 (i.e., flash memory card) has already been widely used in a format, such as a flash memory card, a cassette tape, or a magnetooptic disc. In the present exemplary embodiment, a flash memory card is used as the removable recording medium 105 as an example.

The removable recording medium I/F 104 is provided between the removable recording medium 105 and the recording/reproduction control unit 114. The removable recording medium I/F 104 functions as a physical and electrical interface for the removable recording medium 105. The removable recording medium detection unit 106 detects whether a recording medium is mounted.

The built-in recording medium 107 has already been widely used in a format, such as a semiconductor memory or a hard disk drive (HDD). In the present exemplary embodiment, an HDD is used as the built-in recording medium 107 as an example. The recording/reproduction control unit 114 acquires data from other blocks. In addition, the recording/reproduction control unit 114 controls the recording of the data on the removable recording medium 105 or the built-in recording medium 107. Furthermore, the recording/reproduction control unit 114 reads data from the removable recording medium 105 or the built-in recording medium 107.

A moving image file recording destination recording medium is set by a user by operating a user operation unit 111 before starting recording. In this case, the system controller 101 stores the setting of the designation of the recording medium. In addition, the recording/reproduction control unit 114 refers to the setting of the designation of the recording medium and determine either of the built-in recording medium 107 and the removable recording medium 105 as the moving image file recording destination recording medium.

In recording a moving image file on the removable recording medium 105, the present exemplary embodiment executes the following processing. That is, the recording/reproduction control unit 114, by using the removable recording medium detection unit 106, detects whether a removable recording medium 105 is mounted. If a removable recording medium 105 is detected, the recording/reproduction control unit 114 determines whether the mounted removable recording medium 105 is in a recordable state.

If the removable recording medium 105 is in a recordable state, the present exemplary embodiment records the moving image file, which is transferred from the recording/reproduction control unit 114, on the removable recording medium 105 via the removable recording medium I/F 104, which is an interface in the physical layer.

The recording/reproduction control unit 114 records the moving image file transferred via the system bus 124 on the built-in recording medium 107 or the removable recording medium 105.

The reproduction/display block includes the audio output unit 110 and a display unit 108. The audio output unit 110 outputs data input from other blocks to the user as an analog signal. In the present exemplary embodiment, for the audio output unit 110, a speaker or a headphone output terminal can be selectively used. In addition, the display unit 108 is a liquid crystal display (LCD) panel.

The system block includes the user operation unit 111, the system controller 101, and the system bus 124. The system controller 101 includes a central processing unit (CPU) and a memory unit.

The user can input various requests by operating the user operation unit 111. The user operation unit 111 includes a shooting mode designation mode dial, an input designation cross key, and a shooting start/end button for starting and ending recording.

The system controller 101 determines an operation to be executed based on a user request and a state of components of the imaging apparatus 100 and controls the operation of each unit.

The system bus 124 is used by the system controller 101 for transmitting and receiving a control signal for controlling each unit of the imaging apparatus 100 and data. In addition, the system controller 101 includes a functional unit and information, such as a comparator 121, a setting of compression ratio 122, and a setting of file restriction 123.

The communication block includes the network controller 112 and a network I/F 113. The imaging apparatus 100 can communicate with an external apparatus (not illustrated) via the network controller 112 and the network I/F 113. For a protocol of the network, universal serial bus (USB), Ethernet, or Institute of Electrical and Electronic Engineers (IEEE) 1394 can be used. In the present exemplary embodiment, Ethernet is used as the network protocol.

The imaging apparatus 100 can transmit data such as a moving image file to an external apparatus (not illustrated) via the communication block. In the present exemplary embodiment, an "external apparatus" refers to a web server for a moving image sharing service connected to the Internet or an information processing apparatus directly connected to the imaging apparatus 100 by wired or wireless communication.

Figure 2:
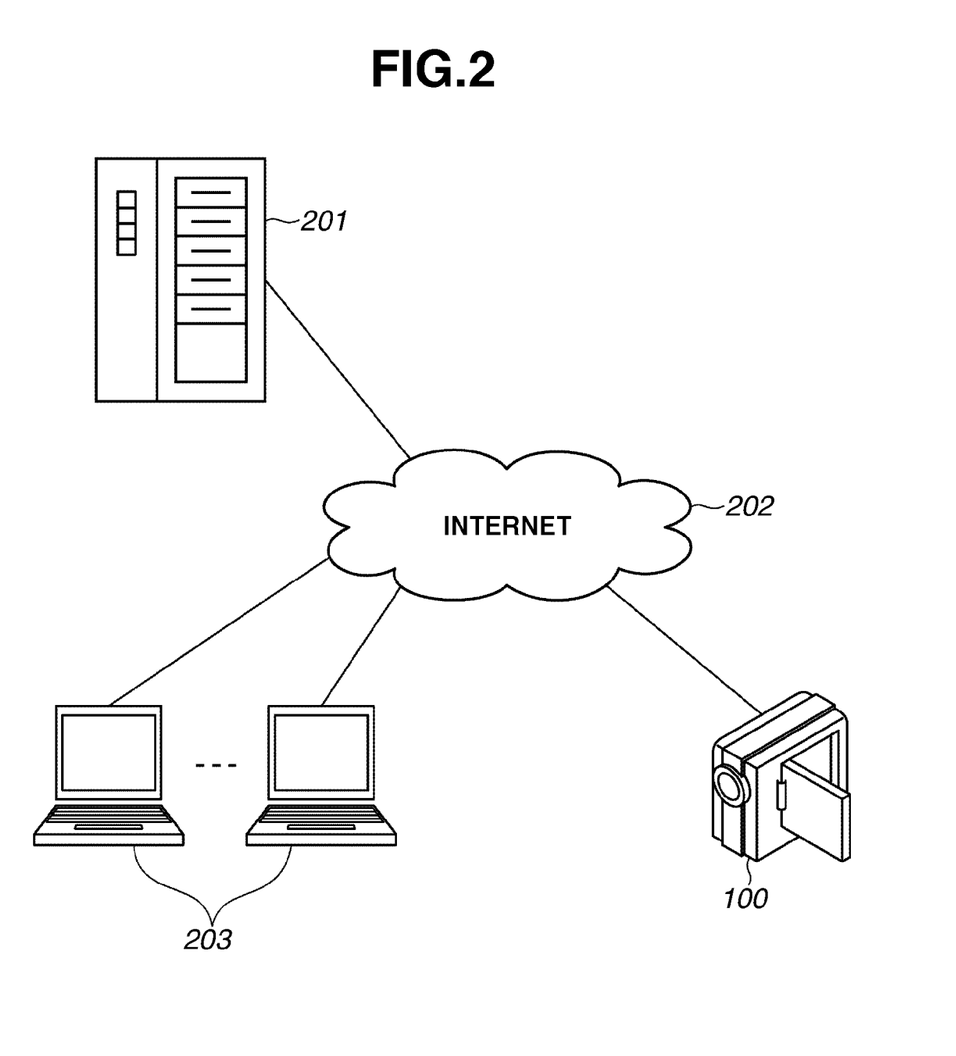
FIG. 2 illustrates an exemplary configuration of a moving image sharing system according to an exemplary embodiment of the present invention.

FIG. 2 illustrates an exemplary configuration of a moving image file sharing system according to the present exemplary embodiment, which includes the imaging apparatus 100 having the above-described configuration, will be described in detail below. The moving image file sharing system includes the imaging apparatus 100 as an image processing apparatus. In addition, the moving image file sharing system includes a web server 201, the Internet 202, and a personal computer (PC) 203.

The carrier of the moving image sharing service provides the web server 201. The web server 201 is connected to the imaging apparatus 100 and a viewing user PC 203 via the Internet 202. The imaging apparatus 100 uploads a moving image file on the web server 201 via the Internet 202.

The viewing user PC 203 activates and uses a web browser, which is installed thereon, to access the web server 201. Furthermore, the viewing user PC 203 downloads an uploaded moving image file and displays the downloaded moving image file on a display thereof. In the above-described manner, a moving image file, which has been uploaded by an uploading user, can be shared among a plurality of viewing users in the moving image sharing system.

Figure 3:
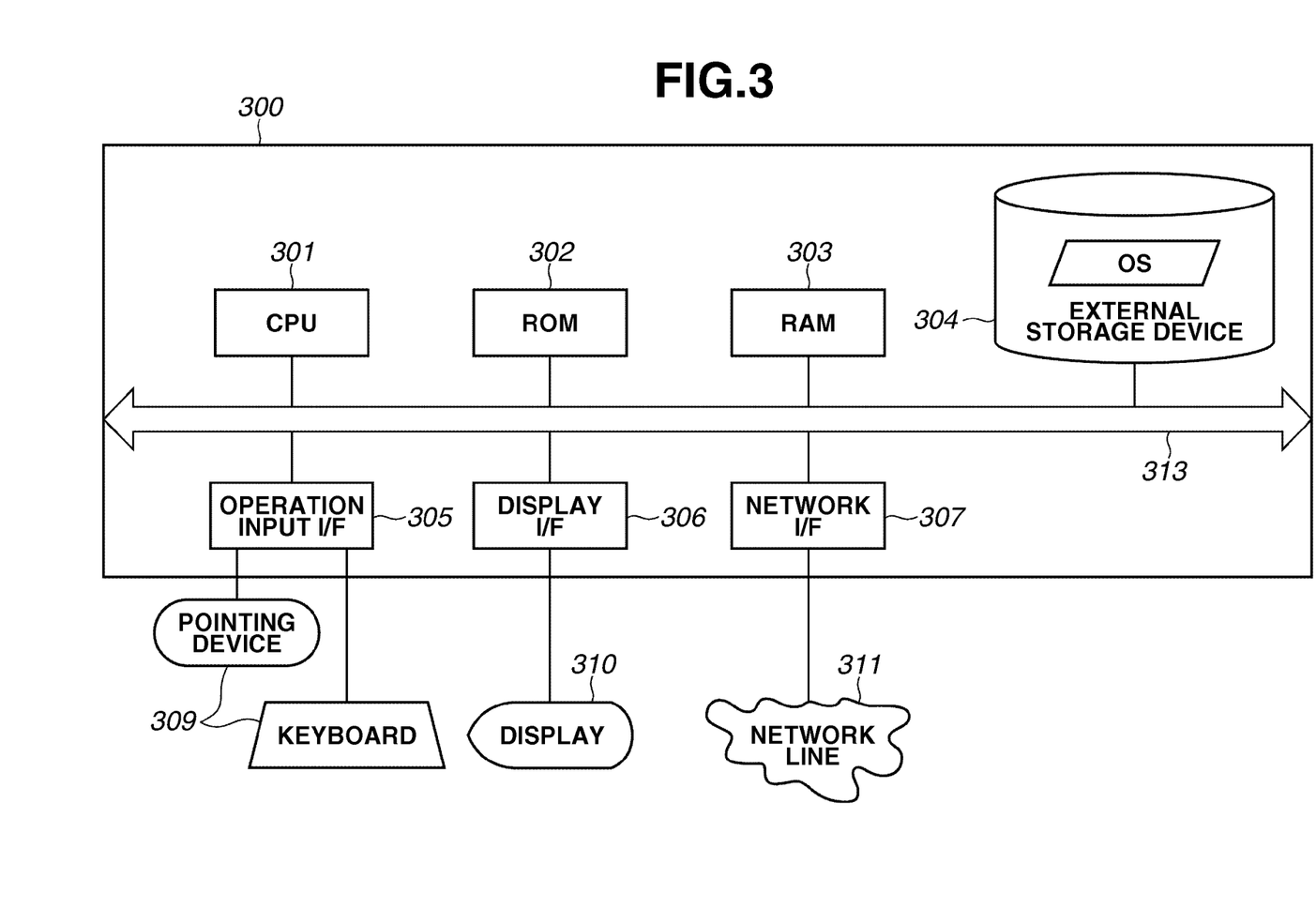
FIG. 3 is a block diagram illustrating an exemplary configuration of an information processing apparatus according to an exemplary embodiment of the present invention.

FIG. 3 is a block diagram illustrating an exemplary configuration of an information processing apparatus 300 according to an exemplary embodiment of the present invention, which can implement the web server 201 and the PC 203. The web server 201 and the PC 203 can be integrated and implemented on one information processing apparatus 300. In addition, various processing functions of the web server 201 and the PC 203 can be implemented on a plurality of information processing apparatuses 300 in a distributed manner.

The information processing apparatus 300 includes a CPU 301, a read-only memory (ROM) 302, a random access memory (RAM) 303, an external storage device 304. In addition, the information processing apparatus 300 includes an operation input I/F 305, a display I/F 306, and a network I/F 307. Furthermore, the information processing apparatus 300 includes input devices (a pointing device and a keyboard) 309, a display 310, and a system bus 313.

The CPU 301 controls the operation of the entire information processing apparatus 300. The ROM 302 stores a program and a parameter that are not changed. The RAM 303 temporarily stores a program and data supplied from an external apparatus. The external storage device 304 fixedly mounted in the information processing apparatus 300.

Various media or units can be used as the external storage device 304. More specifically, a storage device, such as a hard disk or a memory card can be used as the external storage device 304. In addition, a removable storage medium that can be removably installed in the information processing apparatus 300, such as a flexible disk (FD), an optical disk (a compact disc (CD), for example), a magnetic card, an optical card, an integrated circuit (IC) card, or a memory card can be used as the external storage device 304.

The operation input I/F 305 is an interface with the input device 309, such as a pointing device or a keyboard, which can be operated by the user to designate an operation to be executed in the moving image sharing service and to input data. The display I/F 306 is an interface with the display. The display 310 displays data stored on the information processing apparatus 300 or data supplied from an external apparatus or input via a removal medium.

The network I/F 307 is an interface for connecting the imaging apparatus 100 to a network line 311, such as the Internet 202. The CPU 301, the ROM 302, the RAM 303, the external storage device 304, the operation input I/F 305, the display I/F 306, and the network I/F 307 are communicatable with one another via the system bus 313.

Figure 4:
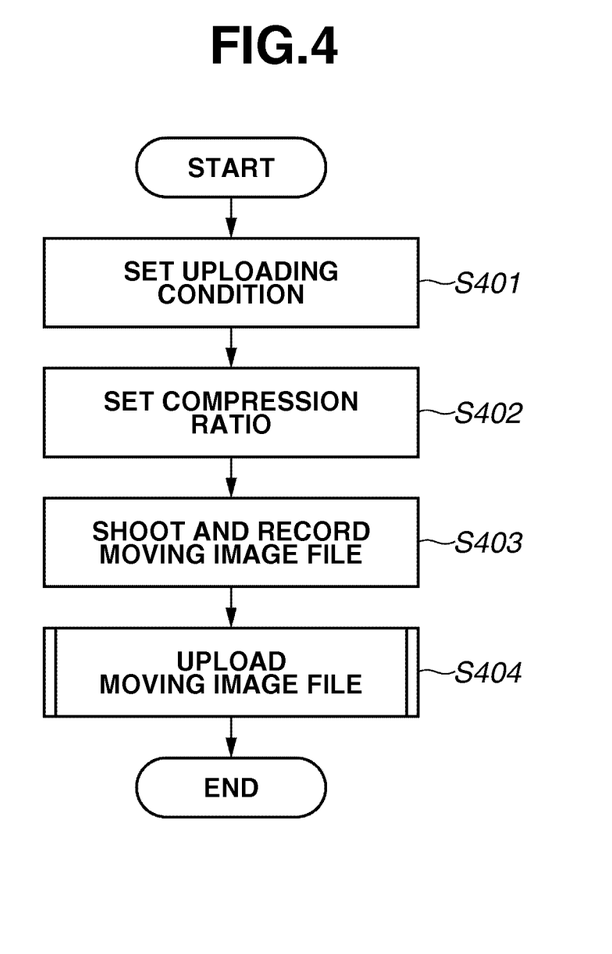
FIG. 4 is a flow chart illustrating exemplary processing executed by the image processing apparatus according to an exemplary embodiment of the present invention.

FIG. 4 is a flow chart illustrating exemplary processing executed by the imaging apparatus 100 to transmit a moving image file to the web server 201. The following processing executed by the imaging apparatus 100, is executed, by the system controller 101, by reading and controlling various modules, according to a predetermined program read from the ROM 302 onto the RAM 303.

When a moving image file uploading user operates the user operation unit 111 to designate an instruction for executing setting, the system controller 101 displays an uploading restriction setting screen 550 on the display unit 108 and the processing illustrated in FIG. 4 starts. Referring to FIG. 4, in step S401, when the moving image file uploading user operates the user operation unit 111 via the uploading restriction setting screen 550, the imaging apparatus 100, the system controller 101 of the imaging apparatus 100 sets an uploading condition in the setting of file restriction 123.

In the example illustrated in FIG. 4, the uploading restriction setting screen 550 is displayed when the moving image file uploading user designates a setting for restricting uploading from a predetermined menu during shooting by a normal shooting mode. Alternatively, it is also useful if the uploading restriction setting screen 550 is displayed when the moving image file uploading user switches the shooting mode of the imaging apparatus 100 from the normal shooting mode to an uploading moving image shooting mode.

Figure 5A:
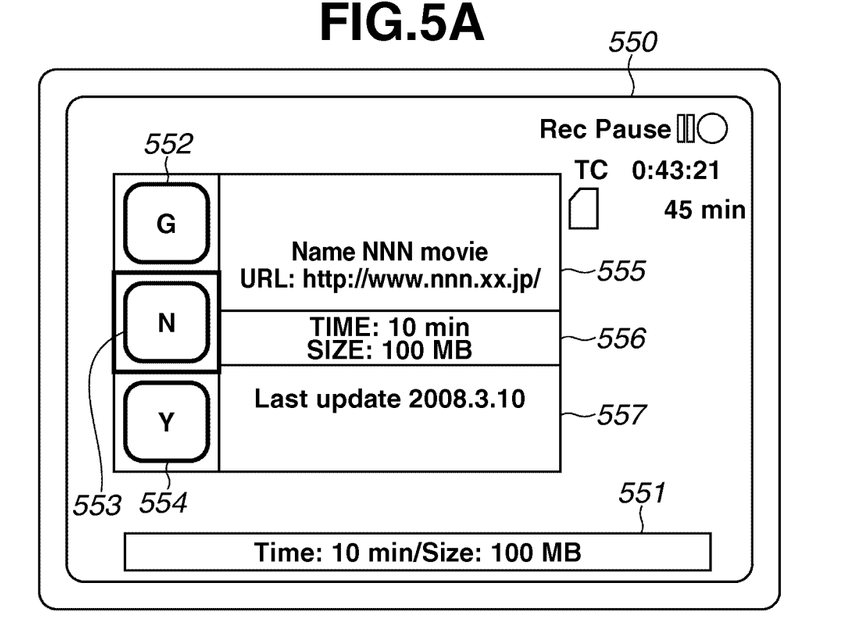
FIGS. 5A and 5B each illustrate an example of a setting screen according to an exemplary embodiment of the present invention.

FIG. 5A illustrates an example of the uploading restriction setting screen 550 according to the present exemplary embodiment. Referring to FIG. 5A, each of icons 552 through 554 indicates a web server of the moving image sharing service, which web server being the target of uploading a moving image file.

In the example illustrated in FIG. 5A, a mouse cursor points at the icon 553. Accordingly, a web server "N", which corresponds to the icon 553, is designated. The designation of an icon is executed according to an operation by the moving image file uploading user on the user operation unit 111.

An uploading condition, which is a condition for restricting uploading of a moving image file, has previously been received by the imaging apparatus 100 from the web server of the moving image file sharing system and also has been set for each web server 201. The imaging apparatus 100 reads the uploading condition corresponding to the designated web server and stores the read uploading condition in the setting of file restriction 123. In the above-described manner, information indicating the uploading condition, which has been stored on the setting of file restriction 123, can be changed.

In the example illustrated in FIG. 5A, as illustrated in a field 556, uploading conditions "reproducing file length: 10 minutes" and "maximum uploading file size: 100 megabytes", which are restrictions applied to a moving image file to be uploaded, are designated. The designated uploading conditions are stored in the setting of file restriction 123.

In addition, information about the web server of the moving image file sharing system, such as the name of a web site and a uniform resource locator (URL) of the web site is indicated in a field 555. Furthermore, a last date and time of connection is indicated in a field 557. Moreover, a field 551 indicates a restriction value, which is stored in a currently set setting of file restriction 123. The restriction value indicated in the field 551 indicates that the information displayed in the field 556 is stored.

Then, when the uploading user operates the operation unit 111 to issue a setting instruction, the system controller 101 displays a shooting mode setting screen 500 on the display unit 108. In step S402 in FIG. 4, when the uploading user operates the user operation unit 111 on the shooting mode setting screen 500, the system controller 101 of the imaging apparatus 100 sets a value of a compression ratio in the setting of the compression ratio 122.

Figure 5B:
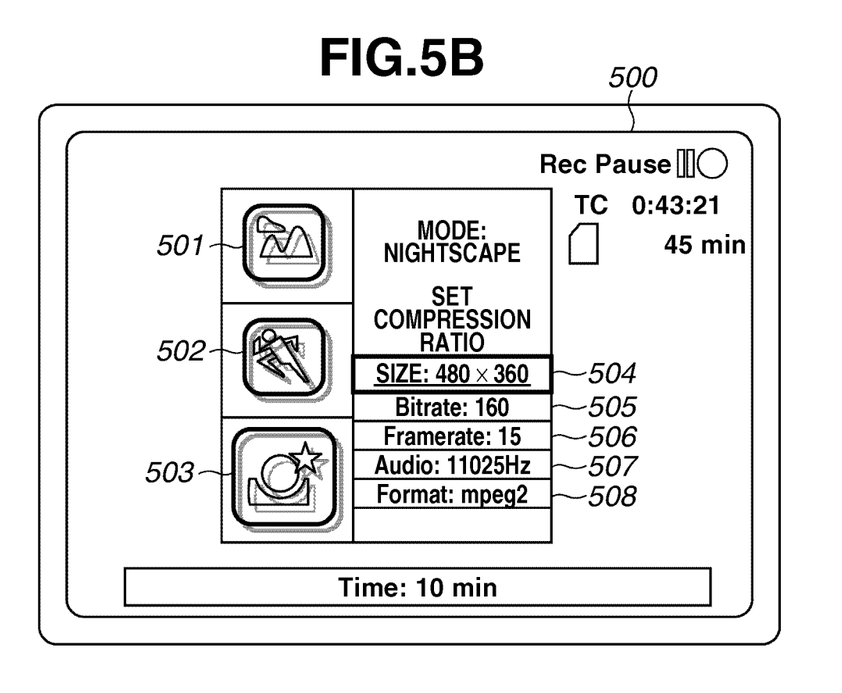

FIG. 5B illustrates an example of the shooting mode setting screen 500 according to the present exemplary embodiment. Referring to FIG. 5B, each of icons 501 through 503 corresponds to a shooting mode. In the example illustrated in FIG. 5B, a "night scene" shooting mode, which corresponds to the icon 503, has been designated.

The compression ratio is previously set corresponding to the shooting mode. Accordingly, a parameter value of the compression ratio is changed according to the change of the shooting mode.

The imaging apparatus 100 stores various parameters. More specifically, the imaging apparatus 100 stores a parameter, such as an image size 504, a bit rate 505, a frame rate 506, an audio sampling rate 507, and a compression format 508 as the setting of the compression ratio. Each of the settings of the compression ratio 504 through 508 corresponds to the designated shooting mode.

It is also useful if the system controller 101 separately sets a parameter value of each item according to the user operation of the user operation unit 111 by the uploading user. In the example illustrated in FIG. 5B, the item "image size" 504 is selected. The parameter value of the image size can be changed when the uploading user operates the key of the user operation unit 111.

When the uploading user operates the user operation unit 111 to issue a shooting instruction, the system controller 101 of the imaging apparatus 100 executes processing for starting shooting and start shooting a moving image. When the shooting starts, the system controller 101 of the imaging apparatus 100 executes correction on a moving image file and audio data input via the imaging unit 102 and the microphone 115.

In step S403 of FIG. 4, when the uploading user presses the shooting start button of the user operation unit 111 again during shooting, the system controller 101 of the imaging apparatus 100 executes processing for ending the shooting. In addition, the system controller 101 records the moving image file including the moving image taken by the shooting on the removable recording medium 105 or the built-in recording medium 107.

In the present exemplary embodiment, the system controller 101 generates an uploading moving image file, which satisfies the condition included in the setting of file restriction 123. The setting of file restriction 123 will be described in detail later below. Furthermore, in the present exemplary embodiment, a condition file, which includes the setting of the compression ratio 122 and the setting of file restriction 123 and associated with a corresponding moving image file, is stored on the removable recording medium 105 or the built-in recording medium 107. However, the present exemplary embodiment is not limited to this. More specifically, it is also useful if the condition file, which is associated with the corresponding moving image file, is stored within the system controller 101.

Figure 6:
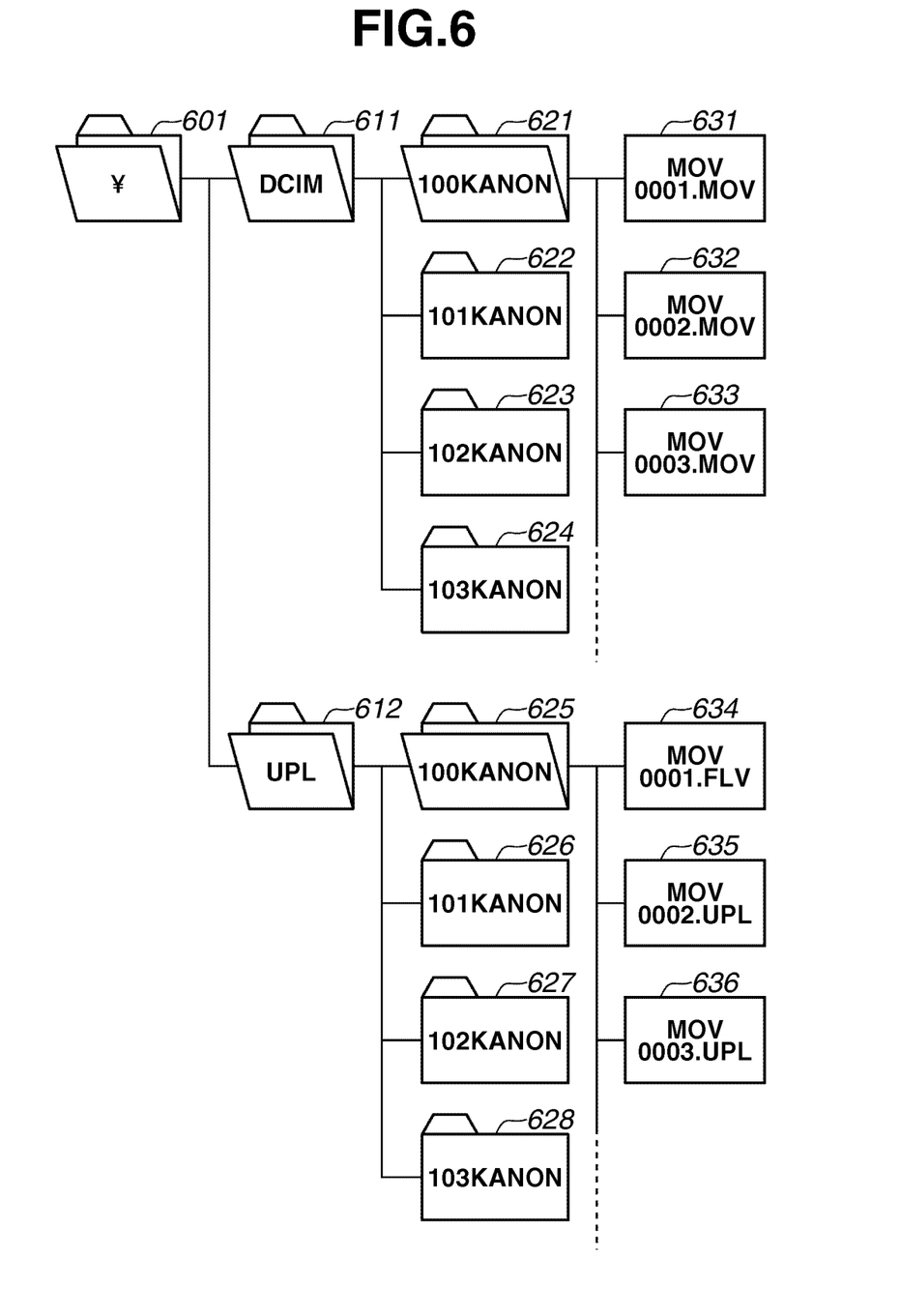
FIG. 6 illustrates an exemplary structure of a directory or a file according to an exemplary embodiment of the present invention.

An example of a structure of the moving image file and the condition file, which are associated with each other, will be described in detail below with reference to FIG. 6. FIG. 6 illustrates an example of a directory or a file structure of a file stored on the removable recording medium 105 or the built-in recording medium 107.

Referring to FIG. 6, a route directory 601 of the removable recording medium 105 or the built-in recording medium 107 includes a plurality of lower-order directories. A higher-order directory 611 is a directory immediately below the route directory 601. The higher-order directory 611 stores a moving image file.

In the example illustrated in FIG. 6, each of lower-order directories 621 through 624 is a directory immediately below the higher-order directory 611. Each of the lower-order directories 621 through 624 stores a moving image file. In the example illustrated in FIG. 6, moving image files 631 through 633 are stored in the lower-order directory 621.

Although not illustrated in an expanded state, each of lower-order directories 622 through 624 can store a moving image file as the lower-order directory 621 does. If a condition file including information about the setting of the compression ratio 122 and the setting of file restriction 123 corresponding to each moving image file exists, the system controller 101 generates a directory 612 having a directory name different from that of the higher-order directory 611.

In addition, the system controller 101 also generates directories 625 through 628, each of which has the same directory structure as that of a moving image file. Furthermore, the system controller 101 stores condition files 634 through 636, each of which is associated with a corresponding moving image file. The system controller 101 records the condition file at the same time when recording the corresponding moving image file.

In step S404 in FIG. 4, when the uploading user operates the user operation unit 111 to issue an instruction for uploading a moving image file, the system controller 101 of the imaging apparatus 100 uploads the designated moving image file onto the web server 201.

The processing in step S404 of FIG. 4 executed by the system controller 101 of the imaging apparatus 100 for uploading a moving image file onto the web server 201 will be described in detail below with reference to a flow chart of FIG. 7. The following processing executed on the imaging apparatus 100 is executed by the system controller 101 by reading and controlling various modules according to a predetermined program read from the ROM 302 onto the RAM 303.

Figure 7:
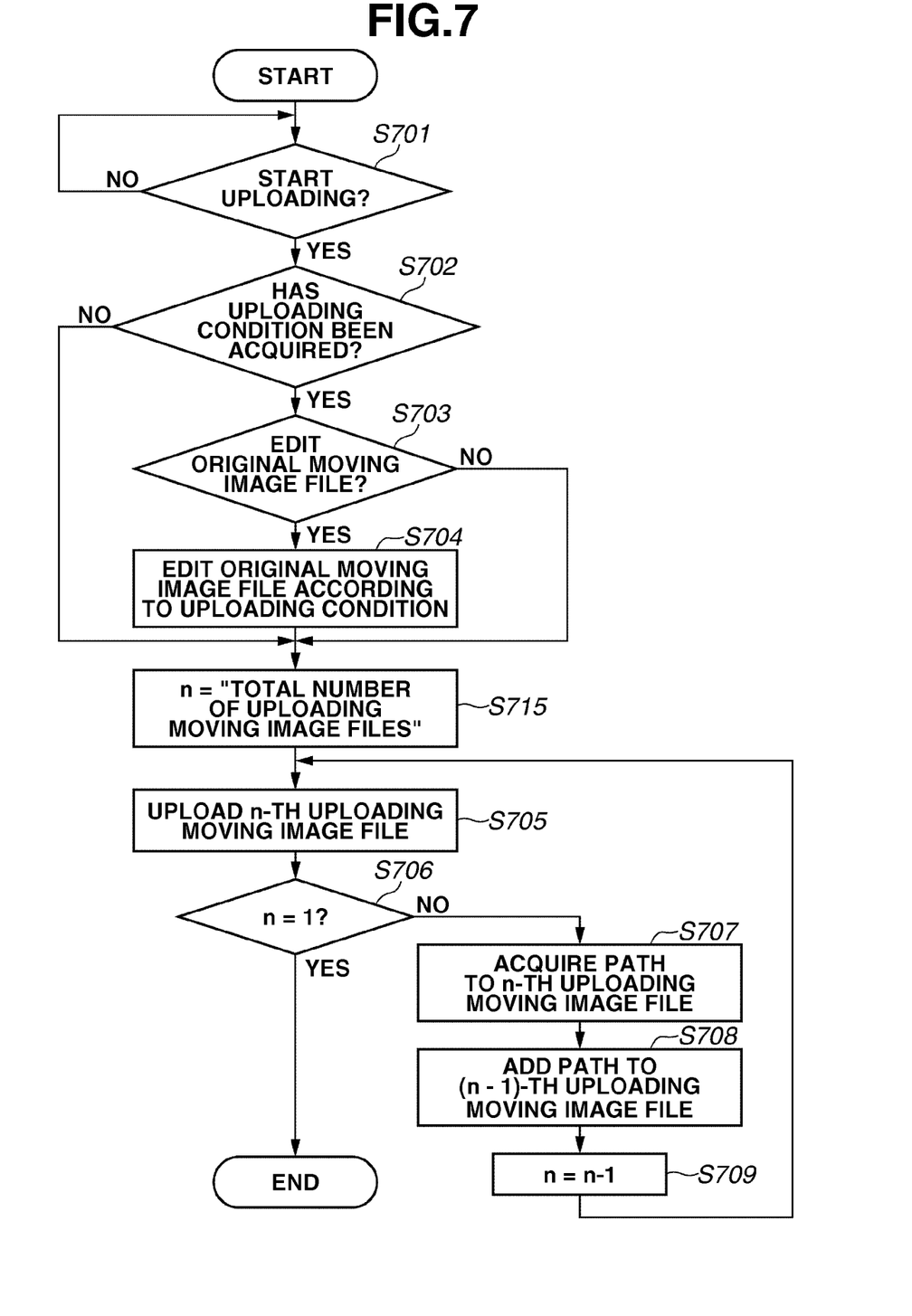
FIG. 7 is a flow chart illustrating exemplary processing executed by the image processing apparatus according to an exemplary embodiment of the present invention.

Referring to FIG. 7, in step S701, the system controller 101 determines whether the uploading user has operated the operation unit 111 and designated a moving image file to issue an instruction for uploading the designated moving image file. If it is determined that the user has issued an instruction for uploading the designated moving image file (YES in step S701), then the processing advances to step S702. On the other hand, if it is determined that the user has not issued an instruction for uploading the designated moving image file (NO in step S701), then the system controller 101 repeats the processing in step S701 and waits until the uploading user issues an moving image file uploading instruction. In step S702, the system controller 101 of the imaging apparatus 100 reads the condition file associated with the original moving image file by the uploading user to be uploaded and determines whether an uploading condition has been acquired.

If it is determined that an uploading condition has been acquired (YES in step S702), then the processing advances to step S703. In step S703, the system controller 101 determines whether it is going to generate an uploading moving image file by editing an original moving image file. The determination in step S703 is executed based on the uploading condition set for the moving image file.

On the other hand, if it is determined that no uploading condition has been acquired (NO in step S702), then the processing advances to step S715. In this case, the system controller 101 uses the original moving image file as the uploading moving image file. In addition, if it is determined that it is not going to generate an uploading moving image file (NO in step S703), then the processing advances to step S715. In this case also, the system controller 101 uses the original moving image file as the uploading moving image file.

On the other hand, if it is determined that it is going to generate an uploading moving image file (YES in step S703), then the processing advances to step S704.

More specifically, if a file format different from that of the original moving image file, for example, has been designated by the user as the uploading condition, then the system controller 101 determines that it is going to generate an uploading moving image file in step S703.

In addition, if the resolution, compression ratio, or frame rate different from those of the original moving image file are designated by the uploading user in the uploading condition, then the system controller 101 determines that it is going to generate an uploading moving image file in step S703. Furthermore, if the file size of the original moving image file is larger than that designated in the uploading condition, then the system controller 101 determines that it is going to generate an uploading moving image file in step S703.

Moreover, if the uploading user has designated recompression of the original moving image file as the uploading condition, then the system controller 101 determines that it is going to generate an uploading moving image file in step S703. In addition, if the uploading user has designated image processing or editing on the moving image in the uploading condition, then the system controller 101 determines that it is going to generate an uploading moving image file in step S703.

Furthermore, if the file size of the original moving image file exceeds a maximum file size designated in the uploading condition, then the system controller 101 determines that it is going to generate an uploading moving image file in step S703. Moreover, if the reproduction time length of the original moving image file exceeds a maximum reproduction time length designated in the uploading condition, then the system controller 101 determines that it is going to generate an uploading moving image file in step S703.

In step S704, the system controller 101 of the imaging apparatus 100 edits the original moving image file to satisfy the uploading condition and generates an uploading moving image file. In the present exemplary embodiment, the system controller 101 generates a duplicate copy of the original moving image file and edits the copy of the original moving image file. Accordingly, when an uploading moving image file is generated, the original moving image file is not erased or overwritten.

In addition, in step S704, the system controller 101 of the imaging apparatus 100 divides the original moving image file so that the file size and the reproduction time length of each divided moving image file are within the maximum file size and the maximum reproduction time length. Thus, a plurality of uploading moving image files, which satisfy the uploading condition, are generated.

Figure 9A:
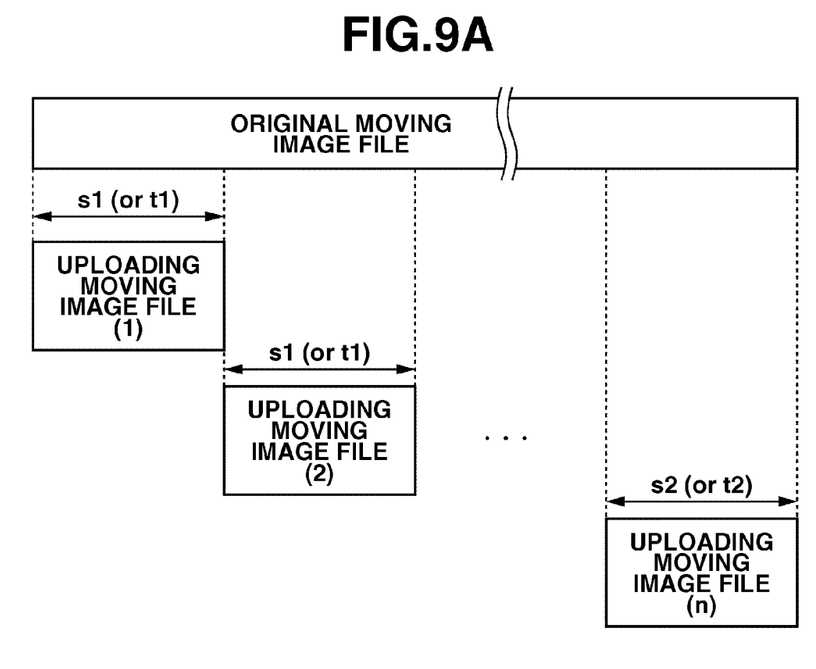
FIGS. 9A and 9B schematically illustrates an example of a result of editing of a moving image file according to an exemplary embodiment of the present invention.

As illustrated in FIG. 9A, the file size of the original moving image file (s) or the reproduction time length of the original moving image file (t) is greater and longer than the maximum file size ($S_{max}$) and the maximum reproduction time length ($T_{max}$) designated in the uploading condition. Accordingly, the system controller 101 divides the original moving image file at a location from a head portion thereof, at which the file size or the reproduction time length of the original moving image file falls within the maximum file size ($S_{max}$) and the maximum reproduction time length ($T_{max}$). Thus, the system controller 101 generates a first uploading moving image file.

Similarly, the system controller 101 divides the remaining portion of the original moving image file, i.e., the portion of the original moving image file whose shooting date and time is later than that of the first uploading moving image file, at a location from a head portion thereof, at which the file size or the reproduction time length of the other portion of the original moving image file falls within the maximum file size ($S_{max}$) and the maximum reproduction time length ($T_{max}$). In the above-described manner, the system controller 101 generates a plurality of uploading moving image files from one original moving image file.

In step S715, the system controller 101 of the imaging apparatus 100 acquires a total number of uploading moving image files and substitutes the acquired total number of uploading moving image files into a counter value "n". If the editing processing in step S704 is not executed or if the editing processing executed in step S704 is not division, then n=1.

In step S705, the system controller 101 of the imaging apparatus 100 uploads an n-th uploading moving image file, which is counted as an n-th file in terms of the shooting date and time, onto the web server 201.

In addition, in step S705, the system controller 101 acquires a path to the uploaded n-th uploading moving image file from the web server 201 and stores the acquired path. In the present exemplary embodiment, the "path" refers to information indicating the location of a moving image file. A URL can be used as the path.

In step S706, the system controller 101 of the imaging apparatus 100 determines whether n=1. More specifically, in step S706, the system controller 101 of the imaging apparatus 100 determines whether all the uploading moving image files corresponding to the original moving image file have been uploaded.

If it is determined that n=1 (YES in step S706), then the processing ends. On the other hand, if it is determined that n≠1 (NO in step S706), then the processing advances to step S707. In step S707 (acquire path to n-th uploading moving image file), the system controller 101 reads the stored path to the n-th uploading moving image file. Then, the processing advances to step S708.

In step S708, the system controller 101 of the imaging apparatus 100 generates sequel notice information including the path acquired in step S707 and adds the generated sequel notice information to an (n−1)th uploading moving image file in a last portion thereof. In step S709, the system controller 101 of the imaging apparatus 100 updates the uploading moving image file total number "n" to "n=(n−1)".

Then, the processing returns to step S705. In step S705, the system controller 101 uploads the n-th uploading moving image file, which includes the sequel notice information added in step S708, onto the web server 201. By executing the above-described processing, an uploading moving image file, whose shooting date and time is immediately previous to the n-th uploading moving image file (i.e., the (n−1)th uploading moving image file), is uploaded next.

After generating a plurality of uploading moving image files generated by dividing the original moving image file in the above-described manner, the system controller 101 uploads the divided uploading moving image files starting from the divided uploading moving image file including a last scene of the original moving image file in a descending order of reproduction time sequence onto the web server 201.

More specifically, the system controller 101 arranges the plurality of uploading moving image files in order of reproduction time sequence as files of one work. Then, the system controller 101 uploads the plurality of uploading moving image files in a descending order starting from the last uploading moving image file. For example, if an original moving image file is divided into three and three uploading moving image files are generated as a result, then the system controller 101 uploads the three uploading moving image files starting from the third file including a scene whose reproduction time is the third (last) of those of the three uploading moving image files. Then, the system controller 101 uploads, onto the web server 201, the second file. After that, the system controller 101 uploads the first file onto the web server 201.

Figure 9B:
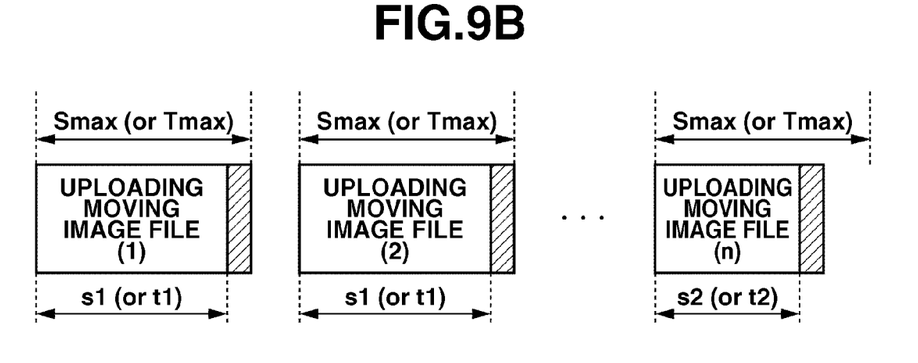

The file size and the reproduction time length of the uploading moving image file illustrated in FIG. 9B, to which the sequel notice information has been added, is within the maximum file size and the maximum reproduction time length described in the uploading condition.

Accordingly, the system controller 101 generates the sequel notice information having a predetermined file size and reproduction time length in step S708. In step S704, the system controller 101 divides the original moving image file so that the file size and the length of the reproduction time of each divided uploading moving image file do not exceed the maximum file size and the maximum reproduction time length even if the file size and the length of the reproduction time of each divided uploading moving image file have increased due to the addition of the sequel notice information thereto.

Furthermore, it is useful if the sequel notice information includes a character string, an image, and a visual effect, which constitute the message indicating, to any uploaded moving image file viewing user, that the moving image file is continued to another subsequent moving image file, as well as a character string indicating the path to the moving image file.

In addition, it is also useful if the sequel notice information is superposedly combined with the last scene of the uploading moving image file. In this case, the length of the reproduction time of the uploading moving image file does not increase even when the sequel notice information is added thereto.

In addition, it is also useful, in step S707, if the system controller 101 acquires a part of a scene including the head portion of the n-th uploading moving image file and uses the acquired scene as the sequel notice information. Furthermore, it is also useful if the system controller 101 superposedly combines the path to the n-th uploading moving image file with the sequel notice information. In this case, the present exemplary embodiment can allow the user to easily recognize that the moving image file has a another subsequent continued moving image file and the outline content of the subsequent moving image file.

Figure 8:
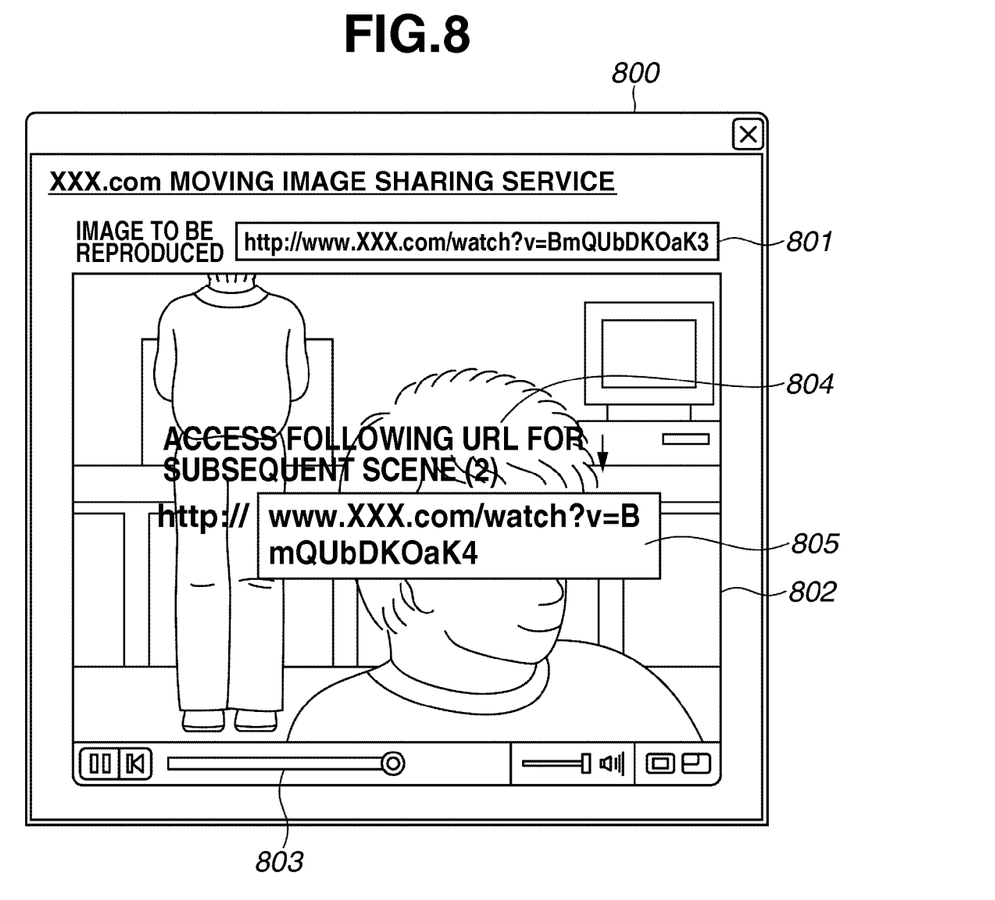
FIG. 8 illustrates an example of a moving image reproduction screen according to an exemplary embodiment of the present invention.

FIG. 8 illustrates an example of the sequel notice information according to the present exemplary embodiment. Referring to FIG. 8, the PC 203 activates a moving image file reproduction application program and displays a moving image reproduction screen 800 on the display 310. In addition, the PC 203 downloads the moving image file from the web server 201 according to the URL input in an entry field 801 by the moving image file viewing user and reproduces the downloaded moving image file. Furthermore, in the example illustrated in FIG. 8, sequel notice information 802, which exists in the moving image file at the last portion (scene) thereof, is displayed.

A slide bar 803 indicates the position of the currently reproduced moving image file. In the example illustrated in FIG. 8, the head circular portion of the slide bar exists at the rightmost portion thereof, which indicates that the current location of the moving image file is the last portion thereof. A message 804 indicates that another subsequent continued moving image file exists to the viewing user. The message 804, which indicates the content illustrated in FIG. 8, enables the viewing user to easily recognize that the currently reproduced moving image file is continued to another subsequent scene.

When the viewing user enters, in the entry field 801, a URL of the subsequent moving image file indicated in a field 805, the PC 203 acquires the corresponding continued moving image file, i.e., the moving image file immediately next to the currently reproduced moving image file in ascending order of the reproduction time sequence, from the web server 201 and reproduces the acquired moving image file.

It is also useful if the PC 203 executes the following processing. That is, the PC 203 detects (extracts) the sequel notice information existing in the last scene of the currently reproduced moving image file. Then, the PC 203 executes character recognition on the extracted sequel notice information by a publicly known method. Then, the PC 203 automatically acquires the URL described in the sequel notice information and automatically enters the acquired URL in the entry field 801. In this case, the present exemplary embodiment can download and reproduce the subsequent moving image file from the web server 201 without requiring an operation therefor by the viewing user.

In addition, it is also useful if the PC 203 adds, to the uploading moving image file, the path to the subsequent moving image file as attribute information instead of adding the sequel notice information to the uploading moving image file. In this case, it is also useful if the PC 203 extracts the URL included in the attribute information of the uploading moving image file, automatically acquires the URL, and automatically enters the acquired URL in the entry field 801.

With the above-described configuration, the present exemplary embodiment can download and reproduce the subsequent moving image file from the web server 201 without requiring an operation therefor by the viewing user.

In the present exemplary embodiment, the system controller 101 of the imaging apparatus 100 divides one original moving image file into a plurality of uploading moving image files and serially uploads the divided uploading moving image files onto the web server 201 in the above-described order. However, it is not limited to this. More specifically, the present exemplary embodiment can be applied when a plurality of original moving image files are integrally processed as one series of works.

More specifically, if each original moving image file satisfies the uploading condition, the system controller 101 serially uploads, on the web server 201, the original moving image files in order starting from the original moving image file to be reproduced at the last of the original moving image files.

In this case, the above-described sequel notice information is added to each original moving image file. On the other hand, if the original moving image file does not satisfy the uploading condition, then it is useful if the system controller 101 divides the original moving image file that does not satisfy the uploading condition according to the uploading condition.

With the above-described configuration, the present exemplary embodiment can allow the uploading user to upload a moving image file according to the condition set on the uploading destination web server without having to execute a complicated operation. In addition, in uploading the moving image file after dividing it into a plurality of uploading moving image files, the user can easily notice that a subsequent continued moving image file exists. Thus, the present exemplary embodiment can increase the convenience of the viewing user.

Now, a second exemplary embodiment of the present invention will be described in detail below. In the present exemplary embodiment, the PC 203 acquires a moving image file from the imaging apparatus 100 and uploads the acquired moving image file onto the web server 201 as an image processing apparatus instead of the imaging apparatus 100. Hereinbelow, the configuration unique and significant to the present exemplary embodiment only will be described in detail and the configuration of the present exemplary embodiment that is similar to that of the above-described first exemplary embodiment will not be repeated.

In the present exemplary embodiment, the PC 203 previously stores an operating system (OS) and a moving image file uploading application program on the external storage device 304. When the uploading user operates the user operation unit 111 to start uploading a moving image file, the CPU 301 of the PC 203 activates the moving image file uploading application program and displays an initial screen on the display 310.

Now, an exemplary operation of the PC 203 will be described in detail below with reference to FIG. 10. The following operation and processing of the PC 203 is executed by the CPU 301 of the PC 203 by controlling each module according to the stored OS and the moving image file uploading application program.

Figure 10:
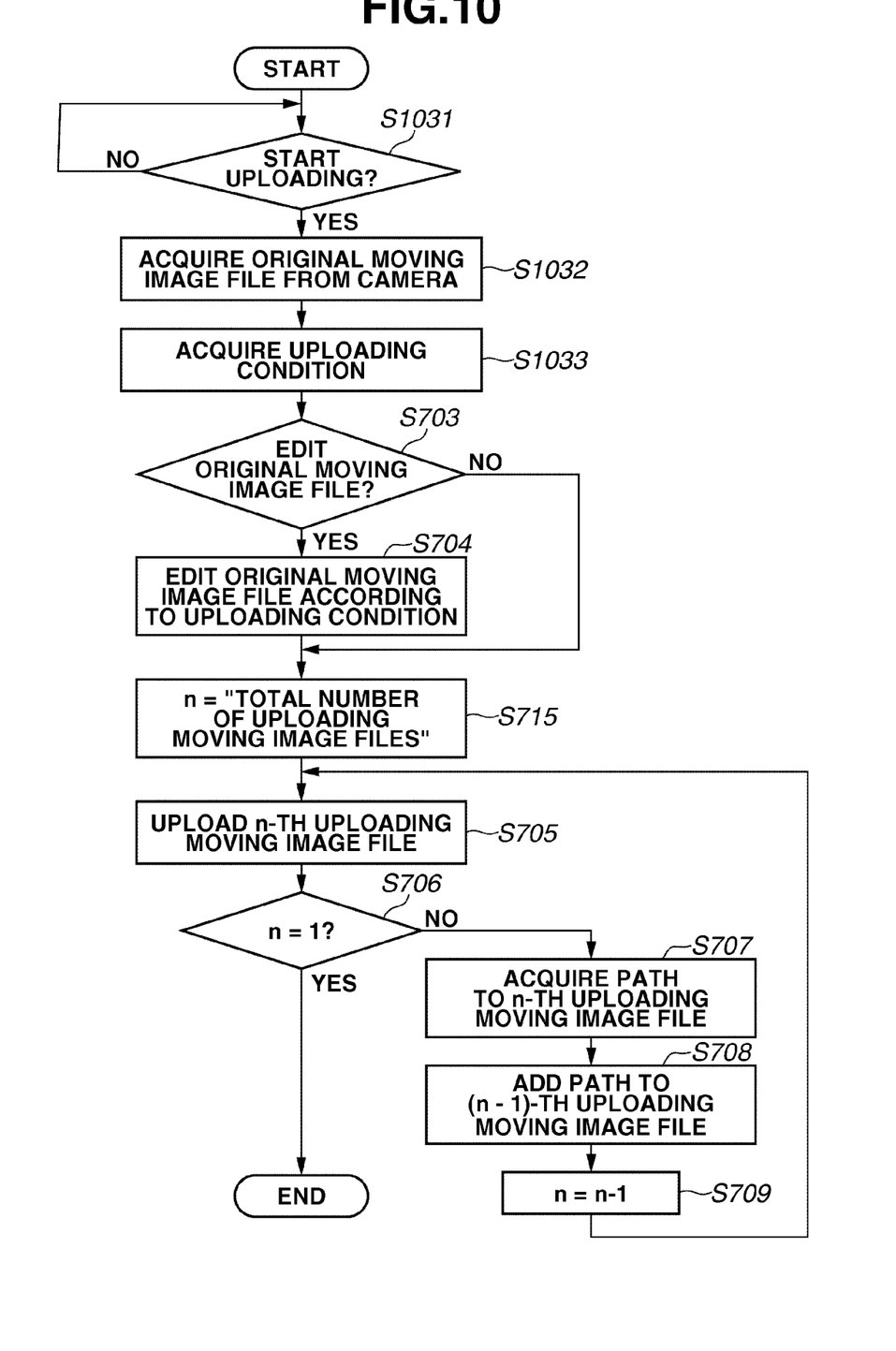
FIG. 10 is a flow chart illustrating exemplary processing executed by the image processing apparatus according to an exemplary embodiment of the present invention.

When the uploading user issues an instruction for starting moving image file uploading processing via the initial screen, the processing illustrated in FIG. 10 starts. Referring to FIG. 10, in step S1031, the CPU 301 determines whether the uploading user has issued a moving image file uploading processing starting instruction. If it is determined that the uploading user has issued a moving image file uploading processing starting instruction (YES in step S1031), then the processing advances to step S1032. In step S1032, the CPU 301 of the PC 203 acquires a moving image file from the imaging apparatus 100, which is connected to the PC 203 by wireless or wired communication. If not (NO in step S1031), the CPU 301 goes back to the start again.

In step S1032, it is also useful if the CPU 301 of the PC 203 acquires all moving image files stored on the imaging apparatus 100 and allows the uploading user to designate a moving image file to be uploaded. Alternatively, it is also useful if the CPU 301 of the PC 203 acquires a list of moving image files stored on the imaging apparatus 100 and acquires the moving image file selected by the uploading user from the imaging apparatus 100.

In step S1033, the CPU 301 of the PC 203 acquires the uploading condition. More specifically, in step S1033, the CPU 301 of the PC 203 displays a list of the web servers 201, each of which may possibly be designated by the uploading user as an uploading destination web server, on the display 310. When the uploading user designates any web server 201 from those included in the list of the web servers 201, the CPU 301 of the PC 203 reads the uploading condition, which has been stored in association with the designated web server 201. Then, the CPU 301 of the PC 203 executes the processing similar to that illustrated in step S703 and subsequent steps of FIG. 7, which is executed by the system controller 101 of the imaging apparatus 100 in the first exemplary embodiment in the above-described manner.

It is also useful if the system controller 101 of the imaging apparatus 100 stores the uploading condition in association with the moving image file as described above in the first exemplary embodiment and the CPU 301 of the PC 203 acquires the uploading condition from the moving image file to be uploaded in step S1033.

In the present exemplary embodiment, it is also useful if the uploading condition includes information about a compression format. In this case, if the compression format of the moving image file acquired in step S1032 does not match the uploading condition, then in step S704, the CPU 301 of the PC 203 converts the format of the moving image file to the format included in the uploading condition.

With the above-described configuration, if an information processing apparatus, such as a general-purpose PC, uploads a moving image file onto the web server 201, the present exemplary embodiment can allow the uploading user to upload a moving image file according to the condition set on an uploading destination web server 201 without having to execute a complicated operation.

In addition, if a moving image file is divided into a plurality of moving image files and the uploading moving image files are uploaded in the above-described predetermined order, the present exemplary embodiment can allow the viewing user to easily recognize that the currently reproduced moving image file has a subsequent continued moving image file. Accordingly, the present exemplary embodiment can increase the convenience of the viewing user.

The present invention can also be achieved by providing a system or an apparatus with a storage medium storing program code of software implementing the functions of the embodiments and by reading and executing the program code stored in the storage medium with a computer of the system or the apparatus (a CPU or a micro processing unit (MPU)).

In addition, the functions according to the embodiments described above can be implemented not only by executing the program code read by the computer, but also implemented by the processing in which an operating system (OS) or the like carries out a part of or the whole of the actual processing based on an instruction given by the program code.

Further, in another aspect of the embodiment of the present invention, after the program code read from the storage medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-266811 filed Oct. 15, 2008 and No. 2009-205124 filed Sep. 4, 2009, which are hereby incorporated by reference herein in their entirety.

What is claimed is:

1. An apparatus comprising:
a division unit configured to divide an original moving image into a plurality of divided moving images;
an uploading unit configured to upload the divided moving images from end of the original moving image in descending order to an external apparatus; and
an acquisition unit configured to acquire, from the external apparatus, sequel information including information for accessing the divided moving image, when the divided moving image is uploaded, wherein the uploading unit uploads a second divided moving image which exists just before a first divided moving image in the original moving image, with the acquired sequel information including information on location of the uploaded first divided moving image, to the external apparatus, after uploading the first divided moving image, wherein the first divided moving image is downloaded to other apparatus based on the sequel information of the first divided moving image which is uploaded with the second divided moving image after the second divided moving image and the sequel information of the first divided moving image are downloaded to the other apparatus.

2. The apparatus according to claim 1,
wherein the division unit is configured, if the original moving image does not satisfy an uploading condition, to execute a division so that a divided moving image satisfies an uploading condition, and
wherein the uploading condition is that a size of a moving image is smaller than a maximum file size or reproduction time of a moving image is shorter than a maximum reproduction time length.

3. The apparatus according to claim 1, wherein the sequel information includes an image indicating at least one of a location and a part of a scene of a divided moving image.

4. A method comprising:
dividing an original moving image into a plurality of divided moving images;
uploading a first divided moving image to an external apparatus;
acquiring, from the external apparatus, sequel information including information for accessing the uploaded divided moving image, when the divided moving image is uploaded; and
uploading a second divided moving image which exists just before the first divided moving image in the original moving image, with the acquired sequel information including information on location of the uploaded first divided moving image, to the external apparatus, after uploading the first divided moving image, such that the divided moving images are uploaded from end of the original moving image in descending order,
wherein the first divided moving image is downloaded to other apparatus based on the sequel information of the first divided moving image which is uploaded with the second divided moving image after the second divided moving image and the sequel information of the first divided moving image are downloaded to the other apparatus.

5. A non-transitory computer-readable storage medium storing instructions which, when executed by a computer, cause the computer to perform operations comprising:
dividing an original moving image into a plurality of divided moving images;
uploading a first divided moving image to an external apparatus;
acquiring, from the external apparatus, sequel information including information for accessing the uploaded divided moving image, when the divided moving image is uploaded; and
uploading a second divided moving image which exists just before the first divided moving image in the original moving image, with the acquired sequel information including information on location of the uploaded first divided moving image, to the external apparatus, after uploading the first divided moving image, such that the divided moving images are uploaded from end of the original moving image in descending order,
wherein the first divided moving image is downloaded to other apparatus based on the sequel information of the first divided moving image which is uploaded with the second divided moving image after the second divided moving image and the sequel information of the first divided moving image are downloaded to the other apparatus.

6. The non-transitory computer-readable storage medium according to claim 5, further comprising:
executing a division so that the divided moving image satisfies an uploading condition, if the original moving image does not satisfy the uploading condition,
wherein the uploading condition is size of a moving image is smaller than a maximum file size or reproduction time of a moving image is shorter than a maximum reproduction time length.

7. The non-transitory computer-readable storage medium according to claim 5, wherein the sequel information includes an image indicating at least one of a location and a part of a scene of a divided moving image.

8. The apparatus according to claim 2, wherein the second divided moving image, to which the sequel information of the first moving image is added, satisfies the uploading condition.

9. The apparatus according to claim 3, wherein the sequel information of the first divided moving image is superimposed on the last scene of the second divided moving image.

10. The apparatus according to claim 1, wherein the sequel information is attribute information of a divided moving image, indicating a path to the divided moving image.

11. The non-transitory computer-readable storage medium according to claim 6, wherein the second divided moving image, to which the sequel information of the first moving image is added, satisfies the uploading condition.

12. The non-transitory computer-readable storage medium according to claim 7, wherein the sequel information of the first divided moving image is superimposed on the last scene of the second divided moving image.

13. The non-transitory computer-readable storage medium according to claim 5, wherein the sequel information is attribute information of a divided moving image, indicating a path to the divided moving image.

* * * * *